United States Patent [19]

Bremer

[11] 3,892,515

[45] July 1, 1975

[54] GRANULATING APPARATUS

[75] Inventor: Horst Bremer, Lage, Lippe, Germany

[73] Assignee: Gunther Papenmeier KG, Maschinen-und Apparatebau, Detmold, Germany

[22] Filed: Apr. 12, 1974

[21] Appl. No.: 460,556

[30] Foreign Application Priority Data

Apr. 26, 1973 Germany............................ 2321204

[52] U.S. Cl......................... 425/314; 425/DIG. 230
[51] Int. Cl............................................. B29b 1/03
[58] Field of Search .. 425/206, 314, 362, DIG. 230; 264/142

[56] References Cited
UNITED STATES PATENTS

| | | | |
|---|---|---|---|
| 2,059,486 | 11/1936 | Payne et al. | 425/314 |
| 2,177,132 | 10/1939 | Crabtree | 425/314 X |
| 2,279,632 | 4/1942 | Meakin | 425/314 X |
| 3,385,235 | 5/1968 | Rickerd et al. | 425/362 X |

FOREIGN PATENTS OR APPLICATIONS 760,759   11/1956   United Kingdom................ 425/314

Primary Examiner—R. Spencer Annear
Attorney, Agent, or Firm—Strauch, Nolan, Neale, Nies & Kurz

[57] ABSTRACT

A granulating apparatus consisting of a rotatable container, which is formed with a multiplicity of shaped holes through which the material to be granulated is forced by means of one or more rotatable pressure rolls, the rolls being mounted on external bearings and selectively adjustable during operation of the apparatus. A separating device in the form of one or more blades exterior of the container and cooperating with container rotation is used to separate the material leaving the shaped holes from the outside wall of the container in the shape of granules.

15 Claims, 7 Drawing Figures

GRANULATING APPARATUS

BACKGROUND OF THE INVENTION

Apparatus for the production of granules are previously known and may be found in many varied forms of construction. Thus, for example, granulating apparatus are known, in which the material to be granulated is introduced into a horizontal drum and forced through corresponding shaped holes by means of smooth rolls or by means of pins provided on the rolls and engaging with the shaped holes. It is also known to force the material to be granulated between two oppositely rotating toothed wheels, the tooth base of at least one of which is formed with an aperture. It has been found that, in these known granulating apparatus, considerable cost is involved in protecting on the one hand the drive shaft of the drum and on the other hand the drive shaft or shafts of the rolls which are mounted in the drum, or the toothed-wheel shafts, against the material to be granulated. Moreover, high accuracy is necessary in the manufacture of the granulating apparatus, in which corresponding pins or serrations engage. These factors naturally have a considerable effect on the cost of the whole apparatus. Moreover, these known granulating apparatus are very difficult to clean, because they are very heavy and access can be gained thereto only with difficulty. Also, no overload protection is provided, so that in the event of the inadvertent presence of foreign bodies, damage to the whole apparatus can occur.

SUMMARY OF THE INVENTION

A primary object of the invention is to provide an apparatus for the production of granules from pulverous, granular, pasty or like material, more especially of plastics, which is such that, on the one hand, the material to be granulated is withheld from the bearings and on the other hand the servicing of the whole apparatus, and more especially cleaning, is simplified, while the whole apparatus is protected against overloading.

In accordance with the invention, this object is advantageously achieved by virtue of the fact that the container is disposed substantially vertically and has the form of a pot open at the top, by virtue of the fact that each pressure roll is mounted in overhung manner in a bearing located outside the container, and by virtue of the fact that a rocking device, by means of which the roll can be rocked and pressed against the base of the container, engages with the bearing. Further achievement of the invention is enhanced by virtue of the fact that the axis of the container and the axis of the pressure roll, or their projections, intersect one another at any desired positive or negative angle.

The vertical container axis and the pressure roll axis or axes, or the projections of the axes, advantageously intersect one another at an angle of 30° to 60°.

Further convenient developments of the apparatus according to the invention reside in that the pressure rolls are designed in conical form, disc form or mushroom form. The container is correspondingly contoured and has a flat, conical or substantially conical base. In order to homogenize the material to be granulated before the actual granulating operation, the base of the container and the side wall of the container are formed, for example, with undercut portions, corresponding to the form of the pressure rolls. In order to ensure a good conveyance of material, the pressure rolls may be provided with conveying grooves or conveying ribs, for example in the form of a feed screw, on their peripheral surfaces. It is also desirable for this purpose to provide the base of the container with conveying grooves or conveying ribs. In order that the material to be granulated may be maintained at any preselected temperature during the granulating operation, the apparatus may be provided with a heating or coolind device.

Finally, each pressure roll may be so mounted as to be adjustable along its axis and/or along its rocking axis. In this way, additional possibilities are afforded for affecting the form of the gap between the base of the container and the pressure roll, and for the control of the forces acting on the material.

Embodiments of the invention are described by way of example in the following with reference to FIGS. 1 to 7, in which:

FIG. 1 is a diagrammatic sectional illustration of a granulating apparatus with one pressure roll, FIG. 2 diagrammatically illustrates in elevation, and partly in section, a granulating apparatus having two pressure rolls, FIG. 3 is a diagrammatic plan view of the apparatus according to FIG. 2, FIG. 4 diagrammatically illustrates to a larger scale in elevation and partly in section a modified form of the container and of the pressure roll, FIG. 5 diagrammatically illustrates to a larger scale in diagrammatic elevation and partly in section another modified form of the container and of the pressure roll, FIG. 6 is a diagrammatic plan view of the container with a pressure roll, and FIG. 7 is a section along the line A-B in FIG. 6.

DESCRIPTION

The apparatus illustrated in FIG. 1 for the manufacture of granules consists in its basic construction of a vertically disposed potshaped container 2, a pressure roll 3 mounted in overhung manner and a drive 4 with a drive motor 5. The container 2 is rotated about its longitudinal axis 26 by the drive 4, 5. The pressure roll 3 is simultaneously rotated in accordance with the speed of the container by frictional engagement between the peripheral surface of the pressure roll and the container. The pressure roll 3 may also be provided with a separate drive motor. This separate drive motor may be flanged to the pressure roll mounting 6 at its upper end 7.

The pressure rolls 3 are so disposed in relation to the container 2 that the pressure roll axes 25 and the container axis 26, or the projections of these axes, intersect one another at any positive or negative angle. Preferably, the axes are at an angle between 30° to 60° in relation to one another.

The material to be granulated is supplied through a material supply aperture 8 in the top cover 9 of the container. Preferably, the material supply aperture 8 directly communicates with the outlet of a heating or cooling mixer. The granulating process takes place in such manner that the material is forced out of the shpaed apertures 10 by the rotation of the pressure roll 3 and of the rotating container 2. A cross-cutting blade 12 mounted on the pillar 11 of the machine cooperates with the rotating container to sever the material leaving the shaped holes 10 and resulting in small pieces in the form of granules. The granules drop into and are conveyed by the suction device 13 to the associated storage containers or further processing machines.

The advantage of the overhung mounting of the pressure roll 3 resides in that the latter can be pressed against the inside wall 15 of the container as desired, or swung out of the interior 16 of the latter, by rocking about a pivot pin 35 by means of a pressure cylinder 14. This ensures that the interior 16 of the container can be readily cleaned. The pressure exerted on the material being granulated depends upon the pressure of the pressure cylinder 14, which is secured to the pillar 11 by means of a mounting 20.

In order to maintain the material at a desired constant temperature during the granulation, the container 2 is provided with a heating or cooling device, preferably at its base 17. In one suitable construction, heating or cooling fluid medium is supplied and discharged through a supply duct 18 and a discharge duct 19, as shown in FIG. 1. As desired, the pressure roll may also be provided with a corresponding heating or cooling arrangement.

In FIG. 2, the granulating apparatus consisting of the container 2, two pressure rolls 3 and the pressure cylinder 14 is diagrammatically illustrated in elevation and partly in section. The remaining parts, employed as in FIG. 1, are not shown. The pressure rolls are provided with conveying ribs or conveying grooves 21, which have the object of more thoroughly kneading the material to be granulated. The conveying ribs or conveying grooves may have the form of a feed screw. Owing to the fact that, in this dual roll embodiment, the pressure cylinder 14 is freely mounted, a pressure equalization always takes place between the two pressure rolls 3. Plural cross-cutting blades 12 are so mounted that the material leaving the shaped holes 10 is severed into short lengths before the next pressure roll forces further material through the shaped holes 10.

FIG. 3 is a diagrammatic plan view corresponding to FIG. 2, and illustrates that the two pressure roll axes 23 may be disposed slightly offset from the center 22 of the container 2. The arrows 24 show the direction of rotation of the container 2 and the pressure rolls 3. While the pressure rolls 3 according to FIGS. 1 and 3 are of conical form and the base of the container is plane, FIGS. 4 and 5 show modified forms of the pressure rolls and of the base of the container.

Figure 1:
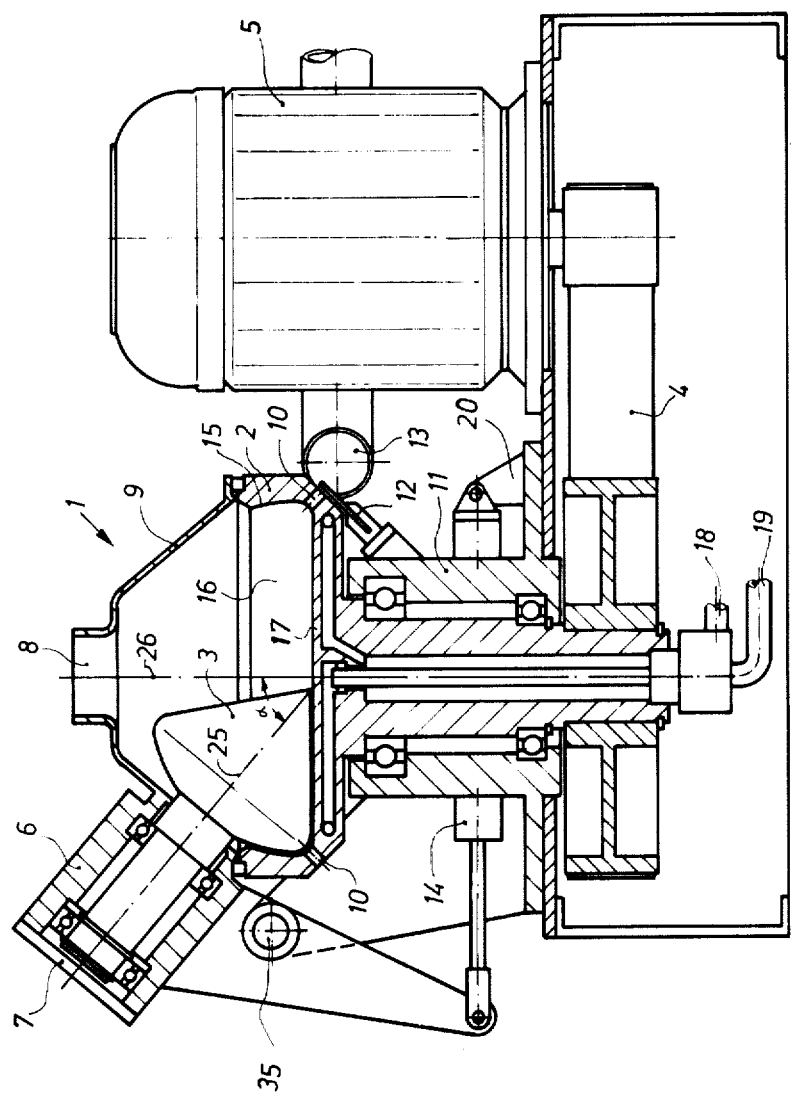
Figure 2:
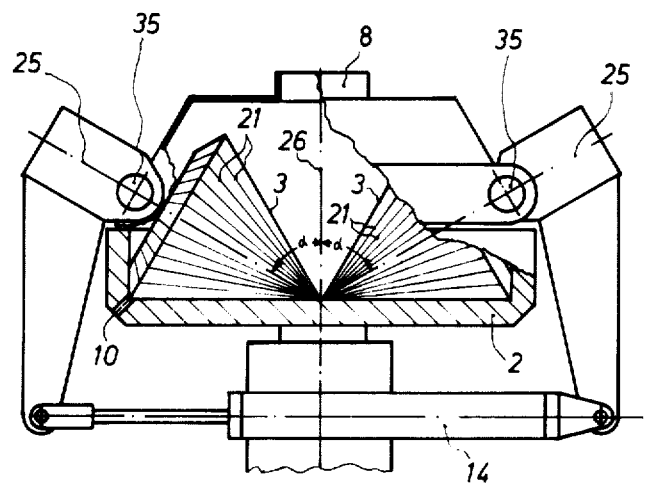
Figure 3:
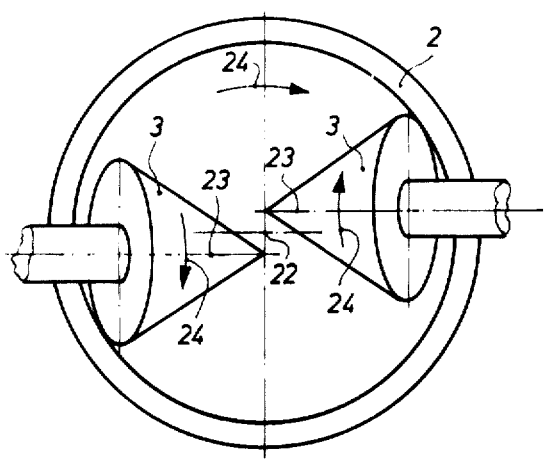
Figure 7:
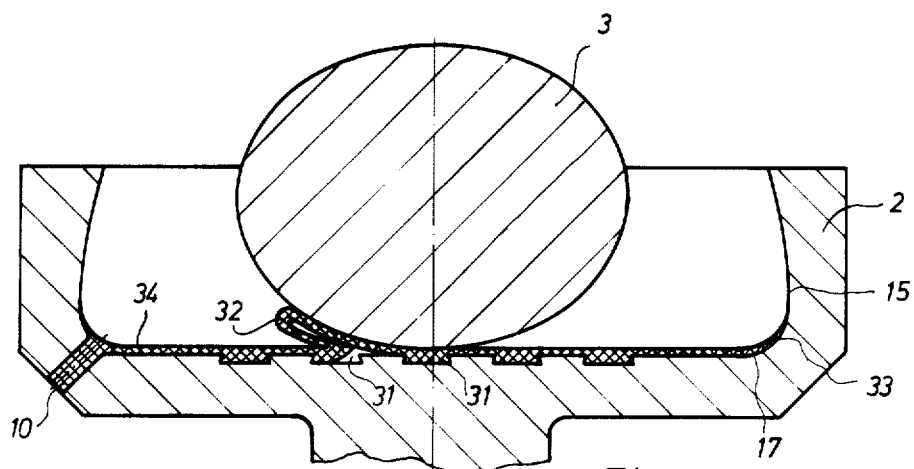
Figure 6:
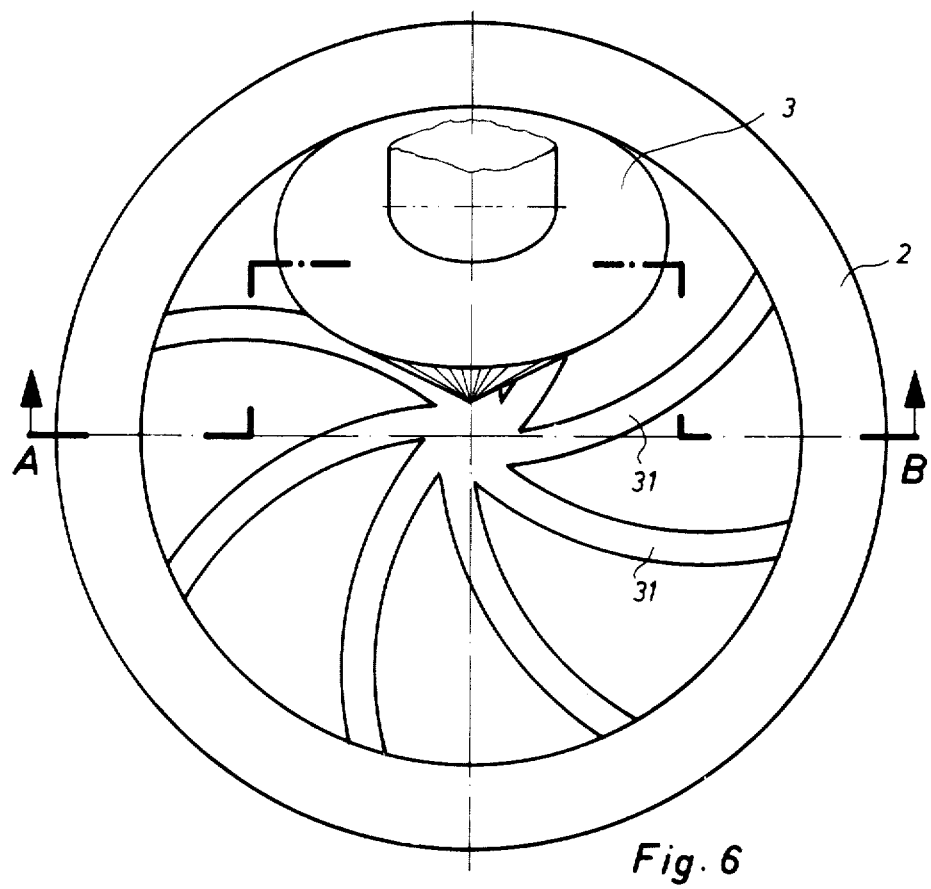

In FIGS. 6 and 7, the container 2 and the pressure roll 3 are shown to a larger scale in plan view and in section, as employed, for example, in the apparatus according to FIG. 1. The container base is formed with conveying grooves 31.

Due to the conical, disc-form or mushroom-shaped design of the pressure roll, the material 34 to be granulated is so thoroughly kneaded that it forms in front of the pressure roll 3, 27, 29 a puckered rolling mass 32 which is lapped over on itself and taken up again by the pressure roll. Due to this rolling or lapping, any air included in the material fed in is forced out in the form of gas.

Figure 4:
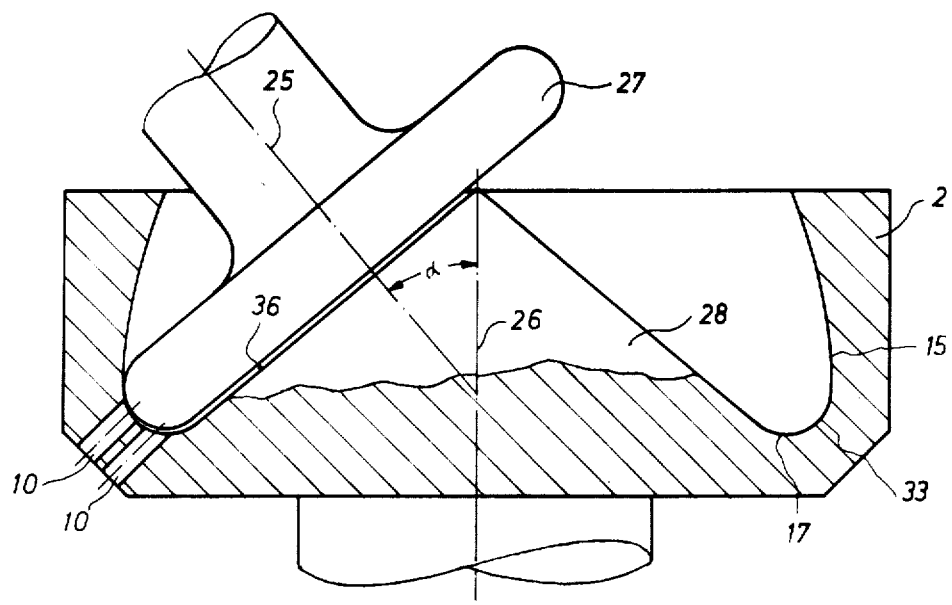
FIG. 4 shows a disc-form pressure roll 27 and a conical container base 28, drawn to a larger scale.
Figure 5:
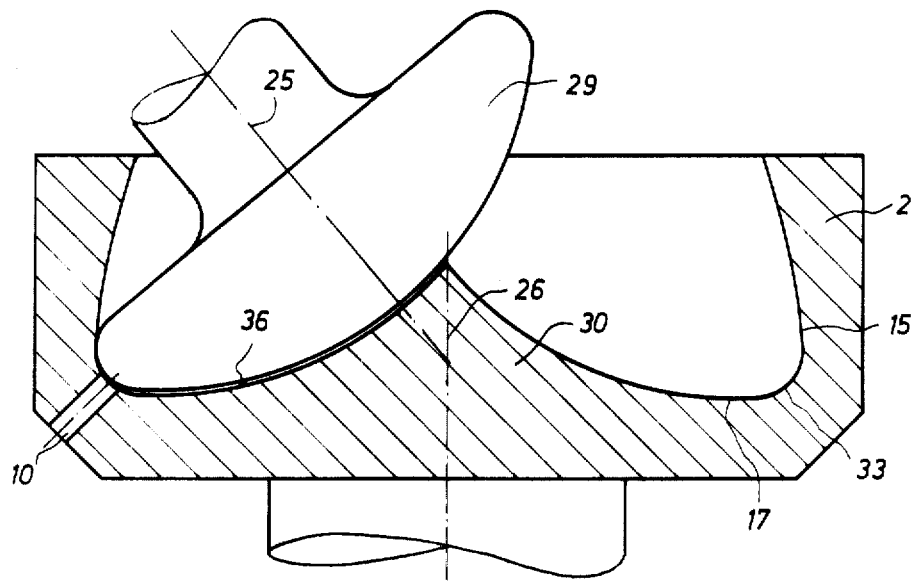
FIG. 5 shows a mushroom-shaped pressure roll 29 and a substantially conical container base 30, drawn to a larger scale.

As is apparent from FIGS. 4, 5 and 6, the container 2 is formed with undercut portions 33 both in its side wall 15 and in its base 17. The material 34 to be granulated is introduced into these undercut portions 33 by the pressure rolls 3, 27, 29 and from there forced through the shaped holes 10. The introduction of the material 34 into the undercut portions can be further promoted by the clearance 36 between the pressure roll 3, 27, 29 and the container base. The clearance 36 can be adjusted by adjustment of the pressure cylinder 14. If, for example, a large amount of material is to be present in this clearance, the pressure must be correspondingly low, while on the other hand when little material is required, for example in the case of intensive kneading, the pressure is raised.

The advantages obtainable with this apparatus reside on the one hand in that it cannot be overloaded, because the output can be adjusted by way of the pressure cylinders and even larger foreign parts or ungranulatable material cannot cause any damage, because blocking of the apparatus is prevented by the outward rocking of the pressure roll. No damage to bearings by introduced material coming into contact therewith is possible. Moreover, the whole apparatus can be readily and reliably serviced, and more particularly cleaned, because the container is freed by the rocking-out of the pressure rolls.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Granulating apparatus consisting of a rotatable container formed with a multiplicity of shaped holes through which the material to be granulated is forced by means of at least one rotatable pressure means, a separating device comprising at least one blade adjacent the outside wall of the container for separating the material leaving the shaped holes characterized by: said container being disposed for rotation about a substantially vertical axis, is pot shaped and open at the upper end; a bearing means disposed outside said container for journalling said rotatable pressure means in overhung manner; a rocking device engaging and mounting said bearing means for selective rocking of said pressure means so it can be rocked and pressed to rotate against the inside base portion of said container; and the container axis and the axis of said pressure means or their projections intersecting one another.

2. Apparatus according to claim 1, characterized in that the axes of said vertical container and the pressure means or the projects of such axes intersect one another at an angle of from 30° to 60°.

3. Apparatus according to claim 1 characterized in that each of said pressure means is a roll having a conical shape.

4. Apparatus according to claim 3, characterized in that the interior of said pot-shaped container is provided with a flat base surface.

5. Apparatus according to claim 1 characterized in that each of said pressure means is a roll having a disc-shape.

6. Apparatus according to claim 5 characterized in that the interior of said pot-shaped container is provided with a substantially conical base surface.

7. Apparatus according to claim 1 characterized in that each of said pressure means is a roll having a mushroomshape.

8. Apparatus according to claim 7, characterized in that the interior of said pot-shaped container is provided with a substantially conical base surface.

9. Apparatus according to claim 1 characterized in that the interior contour where the container base surface and the container side wall surface merge is undercut to complement the form of the rotatable pressure means.

10. Apparatus according to claim 1 characterized in that each pressure means is provided with conveying ribs and grooves on its peripheral surface.

11. Apparatus according to claim 1 characterized in that interior base of said container is provided with conveying grooves and ribs.

12. Apparatus according to claim 1 characterized in that means are provided in said container for temperature control.

13. Apparatus according to claim 12 wherein means are provided in each pressure means for temperature control.

14. Apparatus according to claim 1 characterized in that means mounting said pressure means enables adjustment along its axis.

15. Apparatus according to claim 1 characterized in that means mounting said pressure means enables adjustment along its rocking axis.

* * * * *